(12) United States Patent
Spitler et al.

(10) Patent No.: US 7,922,228 B2
(45) Date of Patent: Apr. 12, 2011

(54) VEHICLE INTERIOR TRIM ASSEMBLY

(75) Inventors: Nicholas Spitler, Farmington Hills, MI (US); Sumedh Mokashi, Farmington Hills, MI (US)

(73) Assignee: Nissan North America, Inc., Franklin, TN (US)

( * ) Notice: Subject to any disclaimer, the term of this patent is extended or adjusted under 35 U.S.C. 154(b) by 164 days.

(21) Appl. No.: 12/392,878

(22) Filed: Feb. 25, 2009

(65) Prior Publication Data
US 2010/0213729 A1 Aug. 26, 2010

(51) Int. Cl.
*B60R 13/00* (2006.01)
(52) U.S. Cl. .................................. 296/24.34
(58) Field of Classification Search ............. 296/24.34, 296/187.05, 1.08, 1.09, 37.8, 70; 280/730.2; 52/716.5; 224/277; 362/396; 428/31; 24/289, 24/297
See application file for complete search history.

(56) References Cited

U.S. PATENT DOCUMENTS

| | | | | |
|---|---|---|---|---|
| 348,706 A * | 9/1886 | Weiner | | 108/115 |
| 995,142 A * | 6/1911 | Homsher et al. | | 108/97 |
| 2,804,126 A * | 8/1957 | Palmer | | 297/160 |
| 2,934,391 A * | 4/1960 | Bohnett | | 312/293.2 |
| 3,356,409 A * | 12/1967 | Belsky et al. | | 296/24.34 |
| 3,632,158 A * | 1/1972 | Boothe | | 296/37.8 |
| 3,909,092 A * | 9/1975 | Kiernan | | 312/235.8 |
| 4,417,764 A * | 11/1983 | Marcus et al. | | 297/188.17 |
| 4,453,759 A * | 6/1984 | Kathiria | | 296/37.8 |
| 4,743,050 A * | 5/1988 | Small | | 281/45 |
| 4,809,897 A * | 3/1989 | Wright, Jr. | | 224/282 |
| 4,938,439 A * | 7/1990 | Fried et al. | | 248/118.5 |
| 5,213,243 A * | 5/1993 | Landon | | 224/277 |
| 5,279,488 A * | 1/1994 | Fleming | | 248/279.1 |
| 5,282,556 A * | 2/1994 | Bossert | | 224/540 |
| 5,433,038 A * | 7/1995 | Dupuy | | 49/377 |
| 5,492,068 A | 2/1996 | McKee | | |
| D368,890 S * | 4/1996 | Morris | | D12/419 |
| 5,730,065 A | 3/1998 | Smith | | |
| 6,032,587 A * | 3/2000 | Salenbauch et al. | | 108/44 |
| 6,086,129 A * | 7/2000 | Gray | | 296/37.8 |
| 6,101,686 A * | 8/2000 | Velthoven et al. | | 24/295 |
| 6,141,837 A * | 11/2000 | Wisniewski | | 24/295 |
| 6,364,589 B1 * | 4/2002 | Wenglinski | | 411/508 |
| 6,367,857 B2 * | 4/2002 | Kifer et al. | | 296/24.34 |
| 6,497,441 B1 * | 12/2002 | Mahmood et al. | | 296/24.34 |
| 6,692,051 B1 * | 2/2004 | Cook et al. | | 296/24.39 |
| 6,848,711 B2 * | 2/2005 | Yamamura et al. | | 280/730.2 |
| 7,029,048 B1 * | 4/2006 | Hicks et al. | | 296/24.34 |
| 7,114,452 B1 * | 10/2006 | Owen | | 108/44 |
| 7,698,867 B1 * | 4/2010 | Stucko et al. | | 52/548 |
| 7,726,527 B2 * | 6/2010 | Lota | | 224/275 |
| 2002/0164200 A1 * | 11/2002 | Wisniewski | | 403/220 |
| 2004/0245146 A1 * | 12/2004 | Kulp et al. | | 206/557 |
| 2007/0119885 A1 * | 5/2007 | Miller et al. | | 224/275 |
| 2008/0054670 A1 * | 3/2008 | Foster et al. | | 296/97.9 |
| 2008/0110950 A1 * | 5/2008 | Dowd et al. | | 224/547 |
| 2010/0213729 A1 * | 8/2010 | Spitler et al. | | 296/1.08 |

* cited by examiner

*Primary Examiner* — Kiran B. Patel
(74) *Attorney, Agent, or Firm* — Global IP Counselors, LLP

(57) ABSTRACT

A vehicle interior trim assembly includes a vehicle structure and a trim member. The vehicle structure defines an interior compartment having at least one trim supporting portion. The trim member is coupled to the trim supporting portion. The trim member has an interior trim surface exposed within the interior compartment and a recessed portion defining a clip receiving lip. The clip receiving lip has a thickness that is less than the overall thickness of the trim member and is dimensioned to support a removable clip. The clip receiving lip includes a first clip engagement surface formed by the interior trim surface, a second clip engagement surface that forms a part of the recessed portion and an edge surface that connects the first and second engagement surfaces.

20 Claims, 6 Drawing Sheets

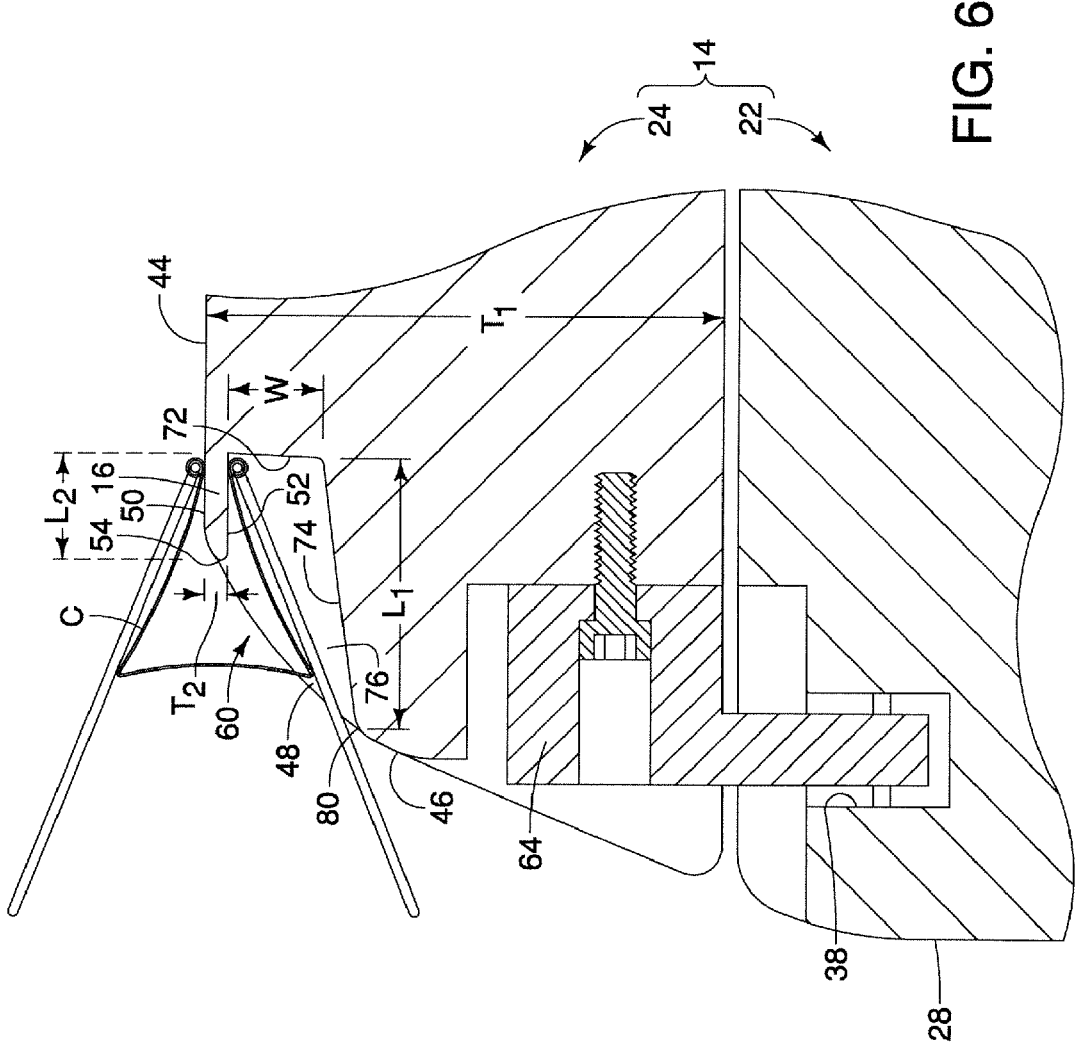

VEHICLE INTERIOR TRIM ASSEMBLY

BACKGROUND OF THE INVENTION

1. Field of the Invention

The present invention relates to a vehicle interior trim assembly. More specifically, the present invention relates to a vehicle interior trim assembly, such as a center console, that includes a clip receiving lip for securing papers and maps to a surface of the interior trim assembly within the vehicle.

2. Background Information

In many non-commercial and commercial uses of modern vehicles, drivers and passengers alike often handle paperwork such as maps, delivery instructions or invoices that are referred to while driving the vehicle. Such papers are typically loose and can fly about within the vehicle if they are not held down or fixed to a clipboard.

Most vehicles include trim components that include storage spaces. Some of these trim components have surfaces that can receive maps or papers, but none have features that provide a means for retaining such loose papers on the exposed surfaces of the trim components.

In view of the above, it will be apparent to those skilled in the art from this disclosure that there exists a need for an improved vehicle trim component that provides a means for visibly retaining papers or maps within the vehicle. This invention addresses this need in the an as well as other needs, which will become apparent to those skilled in the art from this disclosure.

SUMMARY OF THE INVENTION

One object of the present invention is to provide a driver or passenger in a vehicle with a means of retaining papers or maps to a surface of a trim component within the vehicle.

Another object of the present invention is to provide a structure within a vehicle that can receive and support a standard clamping-type clip or jumbo paper clip.

In accordance with one aspect of the present invention, a vehicle interior trim assembly includes a vehicle structure and a trim member. The vehicle structure includes an interior compartment having at least one trim supporting portion. The trim member is coupled to the trim supporting portion. The trim member has an interior trim surface exposed within the interior compartment. The trim member also has a recessed portion defining a clip receiving lip having a thickness that is less than the overall thickness of the trim member and that is dimensioned to support a removable clip. The clip receiving lip includes a first clip engagement surface formed by the interior trim surface, a second clip engagement surface forming a part of the recessed portion and an edge surface connecting the first and second engagement surfaces.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 6 is a cross-section view of a portion of the interior trim assembly taken along the line 6-6 in FIG. 3, showing details of the clip receiving lip in the cover member of the interior trim assembly in accordance with the present invention.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
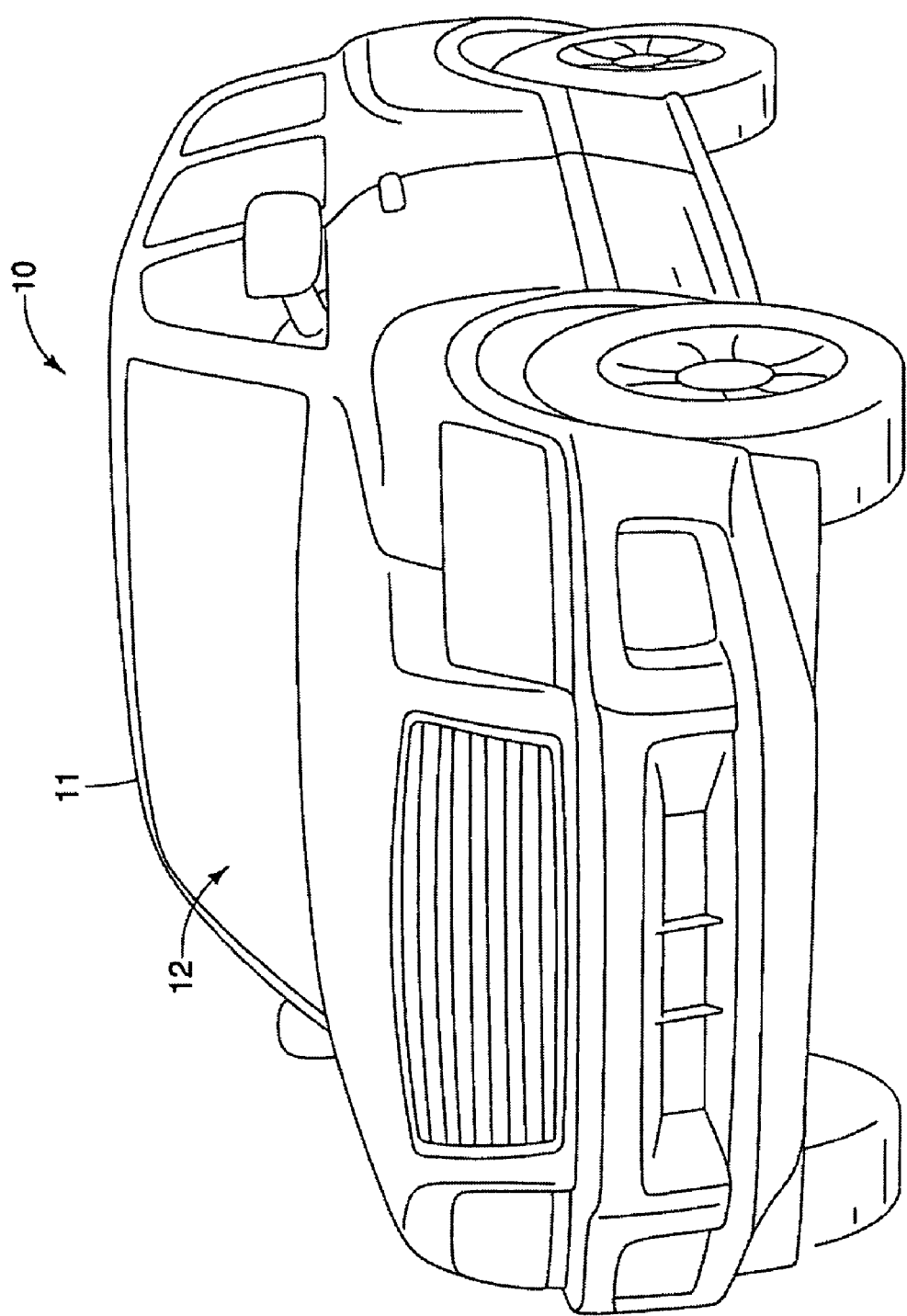
FIG. 1 is a front perspective view of a vehicle having an interior compartment in accordance with the present invention.
Figure 2:
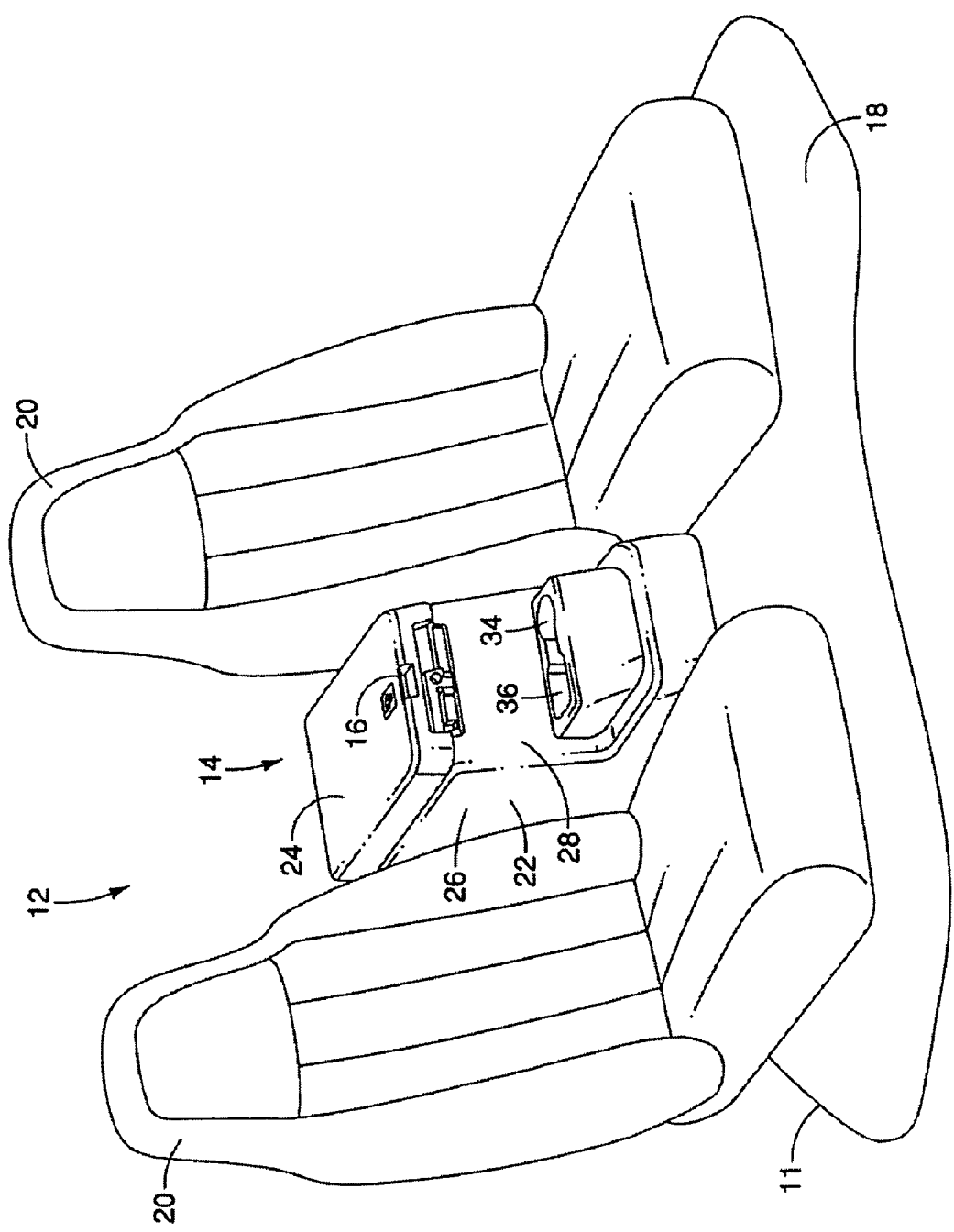
FIG. 2 is perspective view of a portion of the interior compartment showing a pair of seats with an interior trim assembly (a center console) disposed between the pair of seats in accordance with the present invention.

Referring initially to FIG. 1, a vehicle 10 having a vehicle structure 11 with an interior compartment 12 is illustrated in accordance with a first embodiment of the present invention. As shown in FIG. 2, the interior compartment 12 of the vehicle 10 has an interior trim assembly 14 that includes a clip receiving lip 16 in accordance with the present invention, as described in greater detail below.

As indicated in FIG. 2, the vehicle structure 11 of the vehicle 10 includes a trim supporting portion 18, a pair of seats 20 attached to the trim supporting portion 18 and the interior trim assembly 14 disposed between the seats 20. The interior trim assembly 14 is attached to the trim supporting portion 18 within the interior compartment 12.

In the depicted embodiment, the interior compartment 12 is a conventional passenger compartment of the vehicle 10 within the vehicle structure 11. However, it should be understood from the drawings and the description herein that the interior compartment 12 can alternatively be a cargo area within the vehicle. Hence, the interior compartment 12 can be a passenger compartment as shown in the drawings or a cargo space in a central or rearward portion of the vehicle structure 11 of the vehicle 10.

The trim supporting portion 18 is depicted as a floor of the interior compartment 12. The trim supporting portion 18 is therefore a generally horizontal surface within the vehicle 10. However, it should be understood from the drawings and the description herein that the trim supporting portion 18 can be any interior surface of the vehicle structure 11 of the vehicle 10 and is not limited to a generally horizontal surface. More specifically, the trim supporting portion 18 can alternatively be a generally vertical or upright surface within the vehicle 10, such as a dashboard supporting section or a rear cargo area section of the vehicle 10.

A description of the interior trim assembly 14 is now provided with specific reference to FIGS. 2-6.

The interior trim assembly 14 is depicted in the drawings as a center console. However, it should the understood from the drawings and the description herein that the interior trim assembly 14 can be a part of the dashboard or part of an interior cargo area of the vehicle 10.

As best shown in FIGS. 3-6, the interior trim assembly 14 basically includes a support section 22 and a top or cover member 24. The support section 22 is a center console housing that has upright side surfaces 26, a front surface 28, a rear surface (shown in FIG. 5) 30 and a storage compartment 32 that is shown only in FIG. 4. As indicated in FIG. 2, the support section 22 is fixed to the trim supporting portion 18 (the floor of the interior compartment 12). The support section 22 can be molded of a plastic or polymer material as a unitary body or can be assembled with individual panels attached to one another to form the support section 22. Alternatively, the support section 22 can be assembled from a combination of materials, such as a plastic or polymer frame with an outer trim covering or veneer of leather, leather-like material, textile material, wood-like product or wood veneer.

The front surface 28 of the support section 22 of the interior trim assembly 14 includes a cup holder opening 34, a storage tray 36 and a latch recess 38 (shown in FIG. 6). A rear upper edge of the support section 22 includes a hinge 40 (shown in FIG. 4) that pivotally supports the cover member 24.

Figure 3:
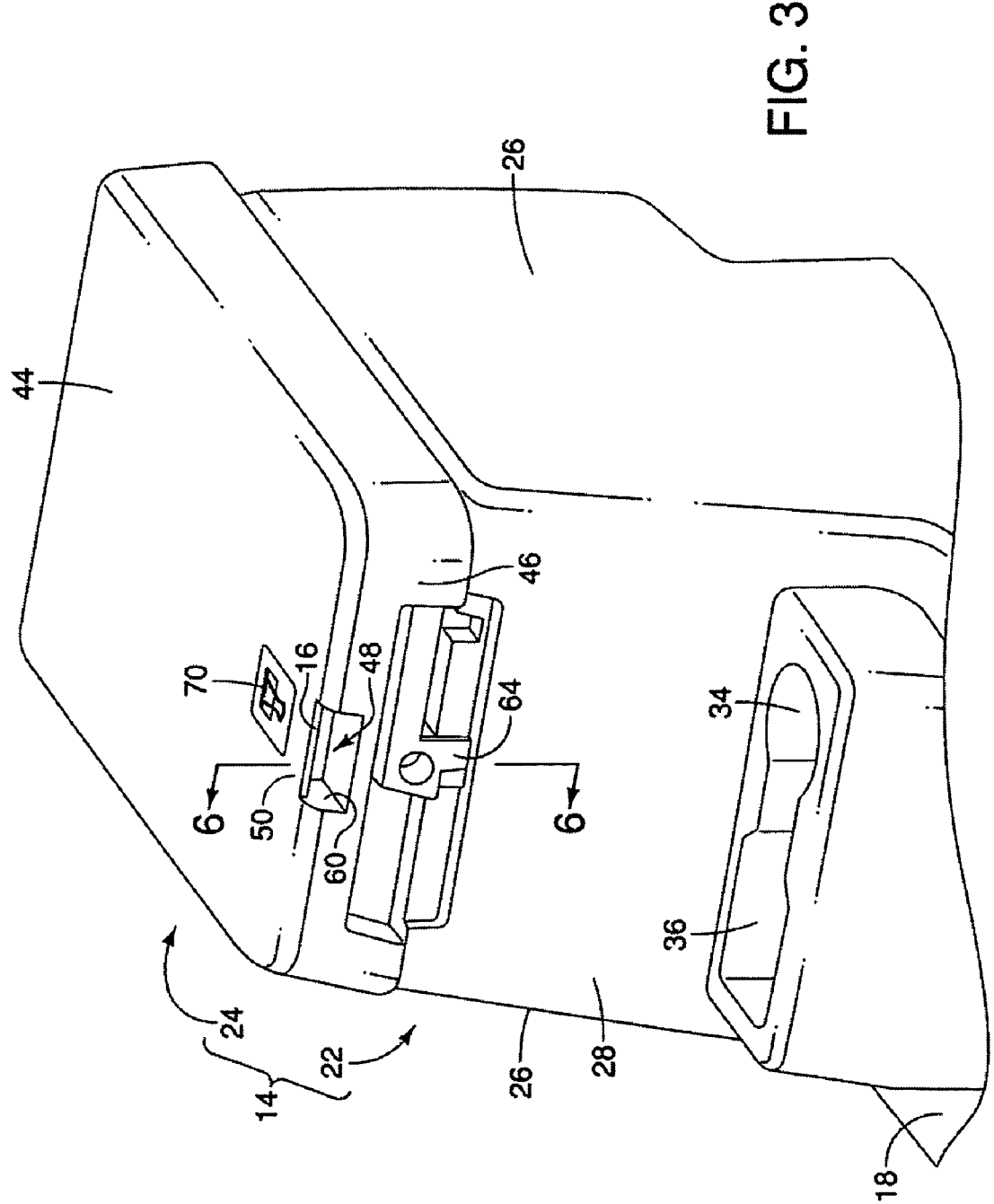
FIG. 3 is a perspective view of the interior trim assembly showing a cover member of the interior trim assembly in a closed position, the cover member having a trim surface that includes a clip receiving lip configured to receive a removable clip in accordance with the present invention.
Figure 4:
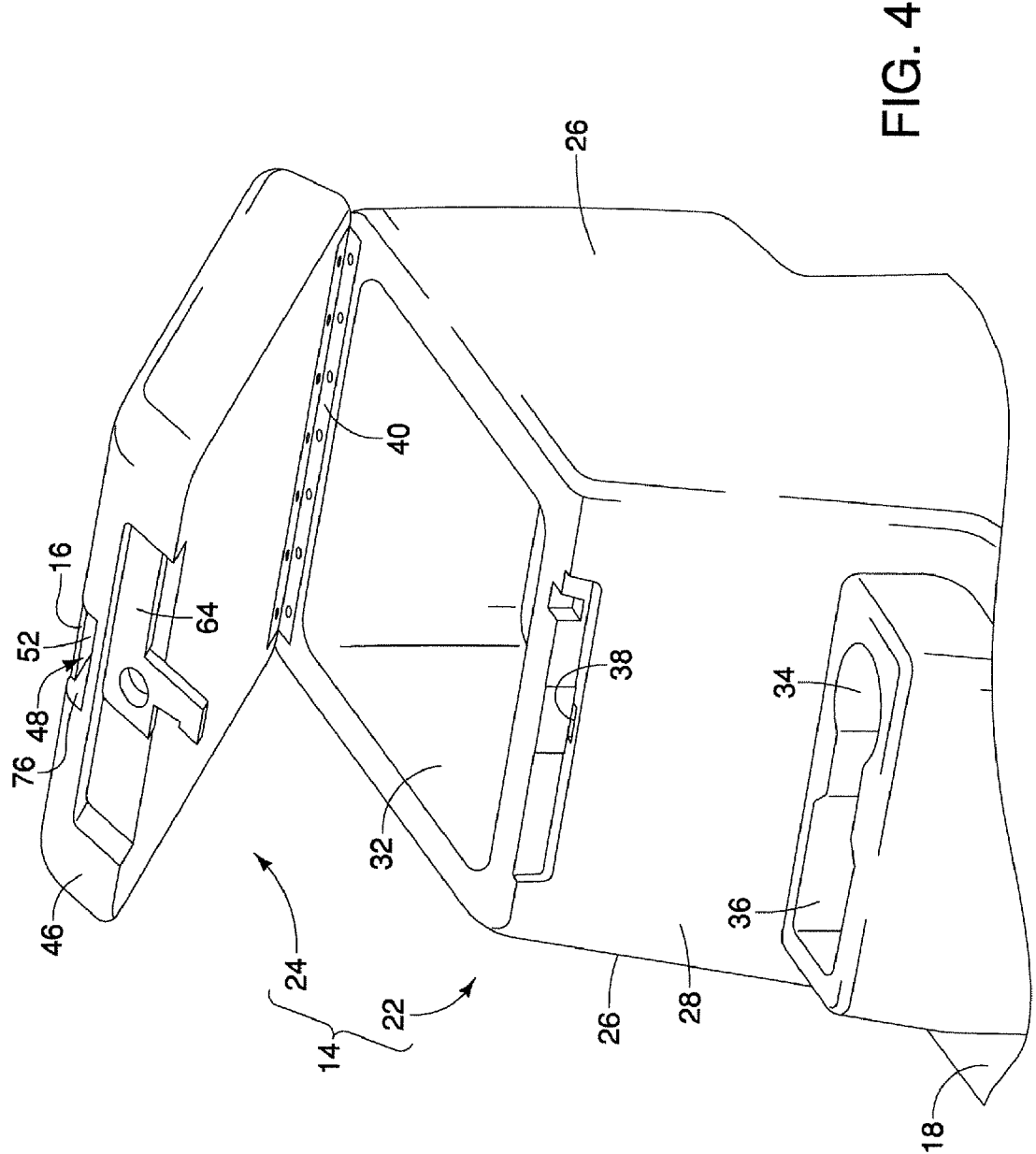
FIG. 4 is a perspective view of the interior trim assembly similar to FIG. 3, but showing the cover member in an opened position in accordance with the present invention.

The cover member 24 (a trim member) is mounted to the support section 22 within the interior compartment 12 and is configured to move between an open position shown in FIG. 4 exposing the storage compartment 32 within interior trim assembly 14 (the center console) and a closed position shown in FIG. 3 covering the storage compartment 32. More specifically the cover member 24 is coupled the support section 22 via the hinge 40. Hence, the cover member 24 (the trim member) is coupled to the trim supporting portion 18 (the floor).

The cover member 24 is shown in the drawings as the cover of a center console. However, it should be understood from the drawings and the description herein that the cover member 24 can alternatively be a trim member such as a portion of the dashboard or a portion of a trim element of a storage unit installed in a central or rearward area within the vehicle 10. In other words, the location of the cover member 24 and hence the location of the clip receiving lip 16 are not limited to being part of a center console, but can be located on or made part of any trim element having an exposed surface within the vehicle structure 11 of the vehicle 10.

The cover member 24 can be molded using a plastic or polymer material as a unitary body or can be assembled with individual panels attached to one another to form the cover member 24. For example, the cover member 24 can be assembled from a combination of materials, such as a plastic or polymer body or frame with an outer trim covering or veneer of leather, leather-like material, textile material, wood-like product or wood veneer.

The cover member 24 (the trim member) has an overall thickness $T_1$, as shown in FIG. 6. The cover member 24 has an interior trim surface 44 exposed within the interior compartment 14, a second trim surface 46 and has a recessed portion 48 that defines the clip receiving lip 16. The clip receiving lip 16 has a thickness $T_2$ that is less than the overall thickness $T_1$ of the cover member 24 (the trim member). The clip receiving lip 16 is dimensioned to support a removable clip C depicted in FIGS. 5 and 6.

Preferably, the removable clip C is a clamping type clip also known as a jumbo paper clip that is biased to clamp onto or grip a stack of papers or clipboard. However, it should be understood from the drawings and the description herein that any type of clip or paper clip can be utilized with the clip receiving lip 16 of the present invention.

The clip receiving lip 16 includes a first clip engagement surface 50 that is part of or is formed by the interior trim surface 44, a second clip engagement surface 52 forming a part of the recessed portion 48 and an edge surface 54 connecting the first and second engagement surfaces 50 and 52.

The second trim surface 46 is angularly offset from the interior trim surface 44 and includes an opening 60 that at least partially defines the recessed portion 48. As best shown in FIGS. 3 and 4, the second trim surface 46 includes a latching mechanism 64 spaced apart from the recessed portion 48. The latching mechanism 64 is configured to releasably retain the cover member 24 (the trim member) in the closed position relative to the support section 22 of the interior trim assembly 14 (the center console).

As is best indicated in FIGS. 3 and 4, the recessed portion 48 and the clip receiving lip 16 are dimensioned and positioned such that the clip receiving lip 16 serves as a lifting handle for moving the cover member 24 (the trim member) from the closed position to the open position.

As best shown in FIG. 3, the interior trim surface 44 includes indicia 70 adjacent to the clip receiving lip 16 identifying the clip receiving lip 16. More specifically, the indicia 70 is in the form of an image of an elastically deformable clip indicating that the clip receiving lip 16 can receive and support such clips.

Figure 5:
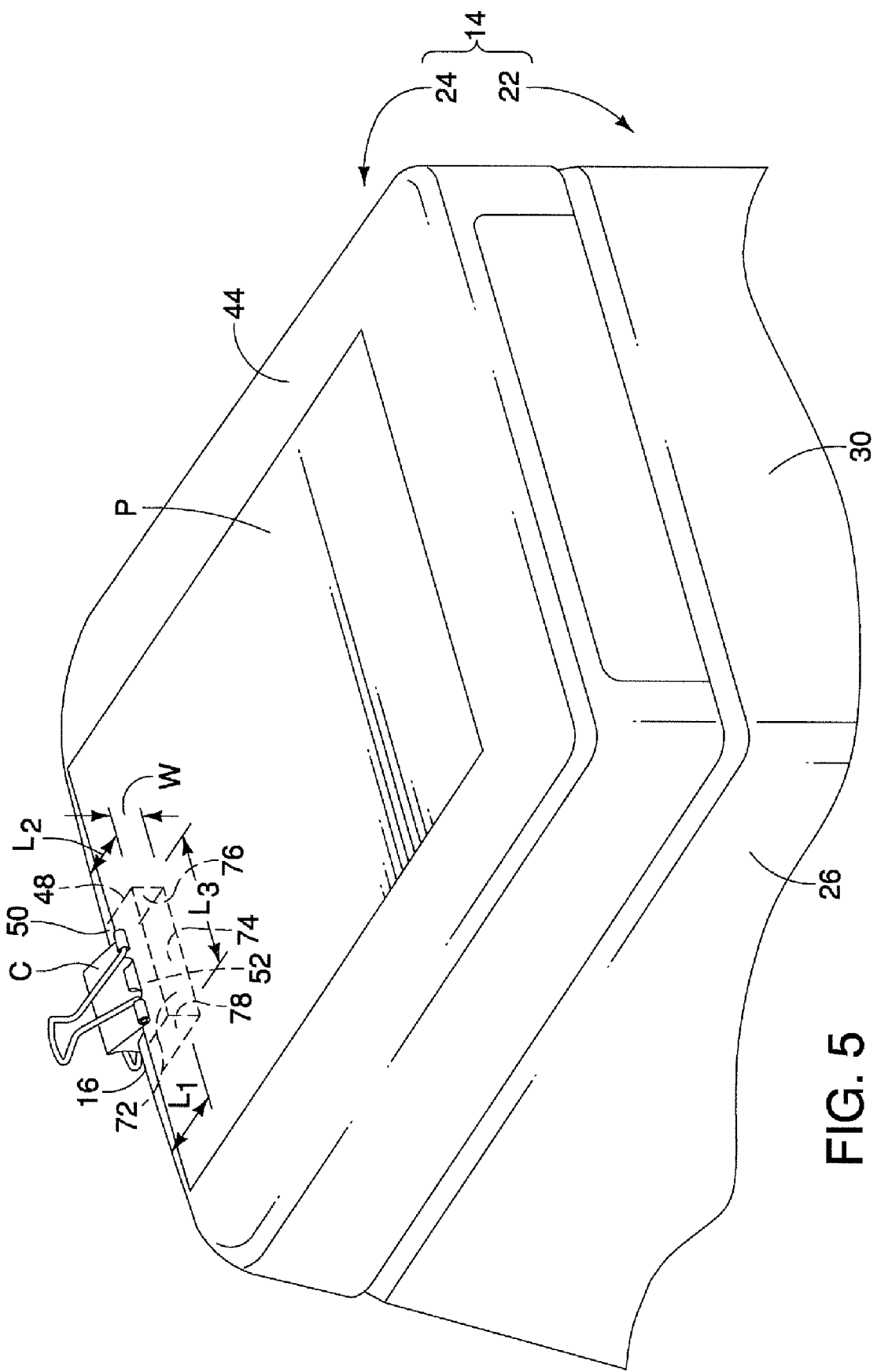
FIG. 5 is a reverse angle perspective view of the interior trim assembly showing a piece of paper clamped to the trim surface by a removable clip that is clamped to the clip receiving lip in accordance with the present invention.

As best shown in FIG. 5, the interior trim surface 44 is dimensioned to support a paper P or papers when a removable clamping member or clip C is clamped to the clip receiving lip 16 clamping such paper P or papers in position.

As best shown in FIG. 6, the recessed portion 48 includes an end surface 72 closing an inner end of the recessed portion 48. The recessed portion 48 also includes a lower surface 74 (a lower wall) that extends in a direction approximately parallel to the second clip engagement surface 52 of the clip receiving lip 16 and a pair of side surfaces 76 and 78 (shown in FIG. 5). As shown in FIG. 5, the side surfaces 76 and 78 face one another on opposite sides of the recessed portion 48. The side surfaces 76 and 78 also extend between respective sides of the second clip engagement surface 52 and the lower surface 74. As shown in FIG. 6, the end surface 72 extends between the lower surface 74 and the second clip engagement surface 52. As shown in FIG. 5, the end surface 72 extends between the side surfaces 76 and 78. The lower surface 74 has a first length $L_1$ measured from the end surface 72 (the inner end) to an outer edge 80 of the recessed portion 48. The second clip engagement surface 52 of the clip receiving lip 16 has a second length $L_2$ measured from the end surface 72 (the inner end) to the edge surface 54 such that the first length $L_1$ is greater than the second length $L_2$. Further, the end surface 72 (the inner end) of the recessed portion 48 has a width W measured between the lower surface 74 and the second clip engagement surface 52 of the clip receiving lip 16 that is less than either of the first length $L_1$ and the second length $L_2$.

Preferably, the first length $L_1$ of the lower surface 74 is at least twice the size of the second length $L_2$ of the second clip engagement surface 52 of the clip receiving lip 16. Preferably, the width W is less than half of the first length $L_1$ of the lower surface 74. Also, as indicated in FIG. 5, the end surface 72 (the inner end) of the recessed portion 48 has a length $L_3$ measured perpendicular to the second length $L_2$ of the second clip engagement surface 52 of the clip receiving lip 16 that is greater than twice the width W of the end surface 72 (the inner end) of the recessed portion 48.

In a preferred embodiment, the interior trim surface 44 is dimensioned to at least support paper that is 8.5 inches by 11 inches with the removable clip clamped to the clip receiving lip and the paper. Further, in a preferred embodiment, the first length $L_1$ of the lower surface 74 is approximately 37 mm or more; the second length $L_2$ of the second clip engagement surface 52 is approximately 15 mm; the length $L_3$ of the end surface 72 (the inner end) of the recessed portion 48 is approximately 60 mm; and the width W of the end surface 72 (the inner end) of the recessed portion 48 is approximately 13 mm.

However it should be understood from the drawings and descriptions herein that these preferred dimensions are only one example of such dimensions. Specifically, the present invention is not limited to the dimensions mentioned above. More specifically, the relative dimensions of the first length $L_1$, the second length $L_2$, the length $L_3$ and the width W can be varied and changed in accordance with various design considerations, such as the size clip C to be used, the amount of paper to be held in position and the orientation of the interior trim surface 44. For instance, if the interior trim surface 44 is a portion of the dashboard or a surface of a cargo area of the vehicle 10 that is not typically positioned in a horizontal orientation, then it can be desirable to change the above dimensions to receive larger clips C or multiple numbers of the clips C in order to ensure that papers held in position by the clips C have sufficient strength and support via the thickness of the clip receiving lip 16.

The various features of the vehicle 10, the vehicle structure 11 and the interior compartment 12 are conventional components that are well known in the art. Since these structures and elements are well known in the art, these structures will not be discussed or illustrated in detail herein. Rather, it will be apparent to those skilled in the art from this disclosure that the components can be any type of structure that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the present invention. Accordingly, these terms, as utilized to describe the present invention should be interpreted relative to a vehicle equipped with the present invention.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle interior trim assembly comprising:
   a support section installed within a vehicle passenger compartment, the support section having a storage compartment; and
   a cover member attached to the support section at least partially covering the storage compartment, the cover member having a trim surface exposed within the passenger compartment, the cover member having a recessed portion defining a clip receiving lip having a thickness that is less than the overall thickness of the cover member and that is dimensioned to support a removable clip, the clip receiving lip including a first clip engagement surface formed by the trim surface, a second clip engagement surface and an edge surface connecting the first and second engagement surfaces, the recess being defined by the second clip engagement surface, a lower surface and an end surface, such that the second clip engagement surface and the lower surface face one another, and the end surface extends between the lower surface and the second clip engagement surface.

2. The vehicle interior trim assembly according to claim 1, wherein
   the support section and the cover member define a center console disposed between seats within the passenger compartment, the cover member being configured to move between an open position exposing the storage compartment within the support section of the center console and a closed position covering the storage compartment.

3. The vehicle interior trim assembly according to claim 2, wherein
   the cover member includes a second trim surface angularly offset from the trim surface, the second trim surface having an opening that is open to the recessed portion.

4. The vehicle interior trim assembly according to claim 3, wherein
   the second trim surface includes a latching mechanism spaced apart from the recessed portion, the latching mechanism being configured to releasably retain the cover member in the closed position relative to the center console.

5. The vehicle interior trim assembly according to claim 4, wherein
   the recessed portion and the clip receiving lip are dimensioned and positioned such that the clip receiving lip serves as a lifting handle for moving the cover member from the closed position to the open position.

6. The vehicle interior trim assembly according to claim 2, wherein
   the recessed portion and the clip receiving lip are dimensioned and positioned such that the clip receiving lip serves as a lifting handle for moving the cover member from the closed position to the open position.

7. The vehicle interior trim assembly according to claim 1, wherein
the first trim surface is dimensioned to support at least one paper article when the removable clip is clamped to the clip receiving lip clamping the at least one paper article in position.

8. The vehicle interior trim assembly according to claim 1, wherein
the trim surface of the cover member includes indicia adjacent to the clip receiving lip identifying the clip receiving lip.

9. The vehicle interior trim assembly according to claim 1, wherein
the end surface of the recessed portion closes an inner end of the recessed portion.

10. The vehicle interior trim assembly according to claim 9, wherein
the lower surface of the recessed portion extends in a direction approximately parallel to the second clip engagement surface of the clip receiving lip.

11. The vehicle interior trim assembly according to claim 10, wherein
the lower surface has a first length measured from the end surface to an outer edge of the recessed portion and the second clip engagement surface of the clip receiving lip has a second length measured from the end surface to the edge surface such that the first length is greater than the second length.

12. The vehicle interior trim assembly according to claim 11, wherein
the end surface of the recessed portion has a width measured between the lower surface and the second clip engagement surface of the clip receiving lip that is less than both of the first length and the second length.

13. The vehicle interior trim assembly according to claim 11, wherein
the first length of the lower surface is at least twice the second length of the second clip engagement surface of the clip receiving lip.

14. The vehicle interior trim assembly according to claim 13, wherein
the end surface of the recessed portion has a width measured between the lower surface and the second clip engagement surface of the clip receiving lip that is less than half of the first length of the lower surface.

15. The vehicle interior trim assembly according to claim 13, wherein
the inner end of the recessed portion has a length measured perpendicular to the second length of the second clip engagement surface of the clip receiving lip that is greater than twice the width of the end surface of the recessed portion.

16. The vehicle interior trim assembly according to claim 1, wherein
the trim surface is dimensioned at least to support paper that is 8.5 inches by 11 inches with the removable clip clamped to the clip receiving lip and at least one paper article.

17. The vehicle interior trim assembly according to claim 3, wherein
the opening in the second trim surface is vertically located between the trim surface and a bottom edge of the second trim surface.

18. The vehicle interior trim assembly according to claim 1, wherein
the recessed portion has a horizontal length measured in a plane including the edge surface that is less than an overall width of the cover member.

19. The vehicle interior trim assembly according to claim 18, wherein
the horizontal length of the recessed portion is less than one-third of the overall width of the cover member.

20. The vehicle interior trim assembly according to claim 1, wherein
the recessed portion is further defined by a first side surface and a second side surface such that the side surfaces face one another on opposite sides of the recessed portion, the lower surface extends between the first and second side surfaces, the second clip engagement surface extends between the first and second side surfaces, and the end surface extends between the first and second side surfaces and the lower surface and the second clip engagement surface.

* * * * *